US012696149B2

(12) United States Patent
Yan et al.

(10) Patent No.: US 12,696,149 B2
(45) Date of Patent: Jul. 28, 2026

(54) METHODS AND APPARATUSES FOR HANDLING FAILURE

(71) Applicant: LENOVO (BEIJING) LIMITED, Beijing (CN)

(72) Inventors: Le Yan, Shanghai (CN); Lianhai Wu, Shanghai (CN); Mingzeng Dai, Shanghai (CN); Congchi Zhang, Shanghai (CN); Yibin Zhuo, Shanghai (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 299 days.

(21) Appl. No.: 18/697,232

(22) PCT Filed: Sep. 30, 2021

(86) PCT No.: PCT/CN2021/122457
§ 371 (c)(1),
(2) Date: Mar. 29, 2024

(87) PCT Pub. No.: WO2023/050427
PCT Pub. Date: Apr. 6, 2023

(65) Prior Publication Data
US 2024/0414604 A1 Dec. 12, 2024

(51) Int. Cl.
*H04W 36/00* (2009.01)
*H04W 36/36* (2009.01)
*H04W 76/27* (2018.01)

(52) U.S. Cl.
CPC ..... *H04W 36/0079* (2018.08); *H04W 36/362* (2023.05); *H04W 76/27* (2018.02)

(58) Field of Classification Search
CPC ........... H04W 36/0079; H04W 36/362; H04W 76/27; H04W 36/185
See application file for complete search history.

(56) References Cited

U.S. PATENT DOCUMENTS 9,392,510 B2 * 7/2016 Jang ...................... H04W 12/02
2020/0314716 A1 * 10/2020 Kim .................. H04W 36/0079

FOREIGN PATENT DOCUMENTS

CN 113396607 A 9/2021
WO 2021159365 A1 8/2021

OTHER PUBLICATIONS

Ericsson. "Reconfiguration during DAPS HO" 3GPP TSG-RAN WG2 #113bis-e Tdoc R2-2102820, Apr. 20, 2021; 24 pages.
(Continued)

*Primary Examiner* — David E Lotter
(74) *Attorney, Agent, or Firm* — AMPACC Law Group, PLLC

(57) ABSTRACT

The present application relates to methods and apparatuses for handling failure. According to some embodiments of the present application, a user equipment (UE), includes a processor; and a receiver coupled to the processor, the receiver being configured to receive a radio resource control (RRC) reconfiguration message from a source node which manages a source cell, the RRC reconfiguration message including both conditional handover (CHO) configurations and per data radio bearer (DRB) dual active protocol stack (DAPS) HO indication for each candidate cell of one or more candidate cells; wherein the processor configured to: perform a first handover procedure to a first target cell selected from the one or more candidate cells; and in response to a failure of the first handover procedure, perform fallback to the source cell when at least one of the following conditions is met: a cell quality of the source cell is higher than or equal to that of each candidate cell of the one or more candidate cells, and there is no radio link failure (RLF) in the source cell; the source cell is selected by a cell selection procedure with configurations of the source cell maintained; the cell quality of the source cell is higher than a threshold;
(Continued)

or an indication indicating that the UE is to perform fallback to the source cell is received.

20 Claims, 7 Drawing Sheets

(56) References Cited

OTHER PUBLICATIONS

Ericsson. "Conditional evaluation upon fallback to source cell after DAPS handover" 3GPP TSG-RAN WG2 Meeting #114-e R2-2105901, May 27, 2021; 5 pages.
CATT. "TS 37.340 CR for CPA and inter-SN CPC" 3GPP TSG-RAN WG2 Meeting #114-e R2-2105062, May 27, 2021; 17 pages.
International Search Report and Written Opinion dated Apr. 25, 2022 for International Application No. PCT/CN2021/122457.

\* cited by examiner

601 —— receiving a RRC reconfiguration message from a source node which manages a source cell 602 —— performing a first handover procedure to a first target cell selected from the one or more candidate cells 603 —— in response to a failure of the first handover procedure, performing fallback to a source cell

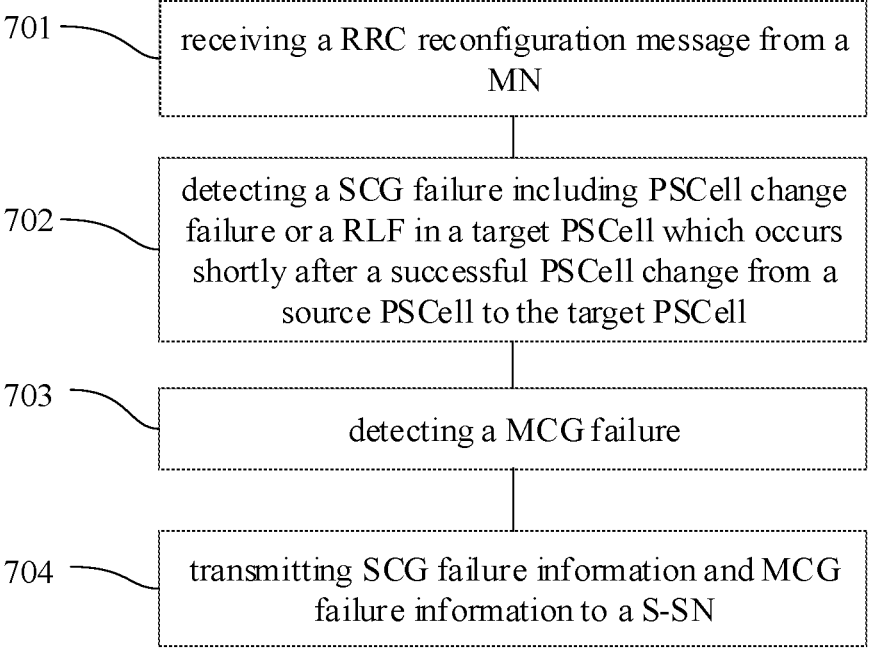

701 — receiving a RRC reconfiguration message from a MN

702 — detecting a SCG failure including PSCell change failure or a RLF in a target PSCell which occurs shortly after a successful PSCell change from a source PSCell to the target PSCell 703 — detecting a MCG failure 704 — transmitting SCG failure information and MCG failure information to a S-SN

Fig. 7

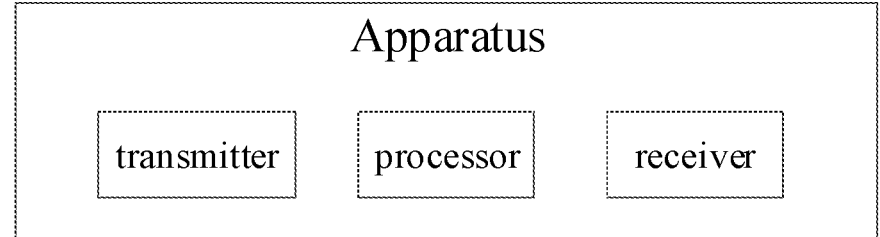

Apparatus transmitter    processor    receiver

Fig. 8

METHODS AND APPARATUSES FOR HANDLING FAILURE

CROSS REFERENCE TO RELATED APPLICATIONS

This application is a national phase entry of International Application No. PCT/CN2021/122457, filed on Sep. 30, 2021, which is incorporated by reference in its entirety.

TECHNICAL FIELD

The present disclosure relates to wireless communication technologies, especially to a method and an apparatus for methods and apparatuses for handling failure.

BACKGROUND OF THE INVENTION

When a user equipment (UE) moves among cells, or the radio coverage areas associated with different base stations (BS), the UE needs to perform a handover procedure. There are many different types of handover.

In R16, dual active protocol stack (DAPS) handover (HO) is introduced to reduce interruption time during handover procedure. In DAPS HO, the UE can keep data communication with the source cell after receiving the DAPS HO command (i.e. a RRCReconfiguration message that includes per DRB DAPS HO indication), and the UE will not release the source link until the target cell informs the UE to do so.

In R16, CHO is introduced to improve handover reliability, i.e. CHO configurations (containing the configurations of one or more CHO candidate cells generated by each candidate node and execution condition(s) for each CHO candidate cell generated by the source node) are sent to the UE, and the UE can select the cell whose CHO execution condition is satisfied as the target cell for handover. In CHO, upon selecting the target cell, the UE detaches from the source gNB, and the UE can't communicate with the source cell any more.

Similarly, conditional primary secondary cell (PSCell) addition and change (CPAC) is introduced to improve handover reliability in multi-radio access technology (RAT) dual connectivity (MR-DC) scenario, i.e. CPAC configurations (containing the configurations of one or more candidate PSCells generated by each candidate secondary node (SN) and execution condition(s) for each candidate PSCell generated by the node initiated CPAC) are sent to the UE, and the UE can select the cell whose CPAC execution condition is satisfied to be the target PSCell for handover. In CPAC, when the UE selects the target PSCell, the UE stops data transmission with the source PSCell.

In R16, CHO or CPAC cannot be configured simultaneously with DAPS HO, that is, the CHO and DAPS HO cannot be configured to the UE at the same time, and the CPAC and DAPS HO cannot be configured to the UE at the same time, either.

However, with the development of some services, e.g. online game and extended reality (XR)/virtual reality (VR), both high reliability and zero interruption time are required, in R18, the CHO and DAPS HO are proposed to be configured to the UE at the same time, and the CPAC and DAPS HO are also proposed to be configured to the UE at the same time.

However, how the UE handles the handover failure in DAPS HO procedure is different from that in CHO procedure, with the CHO and DAPS HO being configured to the UE at the same time, the UE needs to know how to handle the handover failure. Similarly, with the CPAC and DAPS HO being configured to the UE at the same time, the UE also needs to know how to handle the SCG failure.

SUMMARY

According to some embodiments of the present application, a user equipment (UE), includes a processor; and a receiver coupled to the processor, the receiver being configured to receive a radio resource control (RRC) reconfiguration message from a source node which manages a source cell, the RRC reconfiguration message including both conditional handover (CHO) configurations and per data radio bearer (DRB) dual active protocol stack (DAPS) HO indication for each candidate cell of one or more candidate cells; wherein the processor configured to: perform a first handover procedure to a first target cell selected from the one or more candidate cells; and in response to a failure of the first handover procedure, perform fallback to the source cell when at least one of the following conditions is met: a cell quality of the source cell is higher than or equal to that of each candidate cell of the one or more candidate cells, and there is no radio link failure (RLF) in the source cell; the source cell is selected by a cell selection procedure with configurations of the source cell maintained; the cell quality of the source cell is higher than a threshold; or an indication indicating that the UE is to perform fallback to the source cell is received.

In some embodiments, the processor is further configured to: maintain latest received CHO configurations; and transmit a message to the source node after the UE fallbacks to the source cell, wherein the message indicates that the latest received CHO configurations is maintained in the UE.

In some embodiments, in the case that the cell quality of the source cell is lower than that of a candidate cell of the one or more candidate cells, or there is a RLF in the source cell, the processor is further configured to: select a candidate cell with a highest cell quality from the one or more candidate cells as a second target cell; and perform a second handover procedure to the second target cell.

In some embodiments, in the case that a candidate cell from the one or more candidate cells is selected as a second target cell by a cell selection procedure with configurations of the source cell maintained, the processor is further configured to: in response to a failure of a second handover procedure to the second target cell, perform fallback to the source cell if there is no RLF in the source cell.

In some embodiments, in the case that a selected cell by a cell selection procedure with configurations of the source cell maintained is not the source cell, or a cell from the one or more candidate cells, the processor is further configured to: perform a RRC re-establishment procedure.

In some embodiments, in the case that the cell quality of the source cell is not higher than the threshold, the processor is further configured to: perform a second handover procedure to a second target cell, wherein the second target cell is selected by a cell selection procedure, and the second target cell is a candidate cell of the one or more candidate cells; and maintain configurations of the source cell.

In some embodiments, the processor is further configured to: in response to a failure of the second handover procedure to the second target cell, perform fallback to the source cell if there is no RLF in the source cell.

In some embodiments, the processor is further configured to: in response to a failure of the second handover procedure to the second target cell, perform a RRC re-establishment procedure if there is a RLF in the source cell.

In some embodiments, the cell quality is determined based on reference signal receiving power (RSRP), reference signal receiving quality (RSRQ), or RSRP and signal to interference plus noise ratio (SINR).

According to some embodiments of the present application, a base station (BS), includes a processor; and a transmitter coupled to the processor, the transmitter being configured to transmit a radio resource control (RRC) reconfiguration message to a user equipment (UE), the RRC reconfiguration message including both conditional handover (CHO) configurations and per DRB dual active protocol stack (DAPS) HO indication for each candidate cell of one or more candidate cells; wherein the processor is configured to determine whether to transmit an indication indicating that the UE is to perform fallback to a source cell in the event of a handover failure.

According to some embodiments of the present application, a user equipment (UE), includes a processor; and a transceiver configured to receive a radio resource control (RRC) reconfiguration message from a master node (MN), the RRC reconfiguration message including both conditional primary secondary cell (PSCell) addition and change (CPAC) configurations and per DRB dual active protocol stack (DAPS) HO indication for each candidate PSCell of one or more candidate PSCells; and transmit SCG failure information and MCG failure information to a source secondary node (S-SN), wherein the processor configured to: detect a secondary cell group (SCG) failure including PSCell change failure or a radio link failure (RLF) in a target PSCell which occurs shortly after a successful PSCell change from a source PSCell to the target PSCell; and detect a master cell group (MCG) failure.

According to some embodiments of the present application, a master node (MN), includes a transceiver configured to transmit a radio resource control (RRC) reconfiguration message to a user equipment (UE), the RRC reconfiguration message including both conditional primary secondary cell (PSCell) addition and change (CPAC) configurations and per DRB dual active protocol stack (DAPS) HO indication of each candidate PSCell of one or more candidate PSCells; and receive secondary cell group (SCG) failure information and/or master cell group (MCG) failure information from a source secondary node (S-SN).

According to some embodiments of the present application, a source secondary node (S-SN), includes a transceiver configured to receive secondary cell group (SCG) failure information and master cell group (MCG) failure information from a user equipment (UE), and transmit SCG failure information and/or MCG failure information to the MN.

According to some embodiments of the present application, a method performed by user equipment (UE), includes receiving a radio resource control (RRC) reconfiguration message from a source node which manages a source cell, the RRC reconfiguration message including both conditional handover (CHO) configurations and per DRB dual active protocol stack (DAPS) HO indication for each candidate cell of one or more candidate cells; performing a first handover procedure to a first target cell selected from the one or more candidate cells; and in response to a failure of the first handover procedure, performing fallback to a source cell when at least one of the following condition is met: a cell quality of the source cell is higher than or equal to that of each candidate cell of the one or more candidate cells, and there is no radio link failure (RLF) in the source cell; the source cell is selected by a cell selection procedure with configurations of the source cell maintained; the cell quality of the source cell is higher than a threshold; or an indication indicating that the UE is to perform fallback to the source cell is received.

In some embodiments, the method includes maintaining latest received CHO configurations; and transmitting a message to the source node after the UE fallbacks to the source cell, wherein the message indicates that the latest received CHO configurations is maintained in the UE.

In some embodiments, in the case that the cell quality of the source cell is lower than that of a candidate cell of the one or more candidate cells, or there is a RLF in the source cell, the method further includes selecting a candidate cell with a highest cell quality from the one or more candidate cells as a second target cell; and performing a second handover procedure to the second target cell.

In some embodiments, in the case that a candidate cell from the one or more candidate cells is selected as a second target cell by a cell selection procedure with configurations of the source cell maintained, the method further includes in response to a failure of a second handover procedure to the second target cell, performing fallback to the source cell if there is no RLF in the source cell.

In some embodiments, in the case that a selected cell by a cell selection procedure with configurations of the source cell maintained is not the source cell, or a cell from the one or more candidate cells, the method further includes performing a RRC re-establishment procedure.

In some embodiments, in the case that the cell quality of the source cell is not higher than the threshold, the method further includes performing a second handover procedure to a second target cell, wherein the second target cell is selected by a cell selection procedure, and the second target cell is a candidate cell of the one or more candidate cells; and maintaining configurations of the source cell.

In some embodiments, the method includes in response to a failure of the second handover procedure to the second target cell, performing fallback to the source cell if there is no RLF in the source cell.

In some embodiments, the method includes in response to a failure of the second handover procedure to the second target cell, performing a RRC re-establishment procedure if there is a RLF in the source cell.

In some embodiments, the cell quality is determined based on reference signal receiving power (RSRP), reference signal receiving quality (RSRQ), or RSRP and signal to interference plus noise ratio (SINR).

According to some embodiments of the present application, a method performed by a base station (BS), includes transmitting a radio resource control (RRC) reconfiguration message to a user equipment (UE), the RRC reconfiguration message including both conditional handover (CHO) configurations and per DRB dual active protocol stack (DAPS) HO indication for each candidate cell of one or more candidate cells; and determining whether to transmits an indication indicating the UE to perform fallback to a source cell in the event of a handover failure.

According to some embodiments of the present application, a method performed by an user equipment (UE), includes receiving a radio resource control (RRC) reconfiguration message from a master node (MN), the RRC reconfiguration message including both conditional primary secondary cell (PSCell) addition and change (CPAC) configurations and per DRB dual active protocol stack (DAPS) HO indication of each candidate PSCell of one or more candidate PSCells; detecting a SCG failure including PSCell change failure or a radio link failure (RLF) in a target PSCell which occurs shortly after a successful PSCell change from a source PSCell to the target PSCell; detecting a master cell group (MCG) failure; and transmitting SCG failure information and MCG failure information to a source secondary node (S-SN).

According to some embodiments of the present application, a method performed by a master node (MN), includes transmitting a radio resource control (RRC) reconfiguration message to a user equipment (UE), the RRC reconfiguration message including both conditional primary secondary cell (PSCell) addition and change (CPAC) configurations and per DRB dual active protocol stack (DAPS) HO indication of each candidate PSCell of one or more candidate PSCells; and receiving secondary cell group (SCG) failure information and/or master cell group (MCG) failure information from a source secondary node (S-SN).

According to some embodiments of the present application, a method performed by a source secondary node (S-SN), includes receiving secondary cell group (SCG) failure information and master cell group (MCG) failure information from a user equipment (UE); and transmitting SCG failure information and/or MCG failure information to the MN.

BRIEF DESCRIPTION OF THE DRAWINGS

FIG. 7 illustrates a method performed by a UE for handling HO failure according to a preferred embodiment of the present disclosure.

FIG. 8 illustrates a block diagram of an apparatus according to the embodiments of the present disclosure.

DETAILED DESCRIPTION

Figure 1:
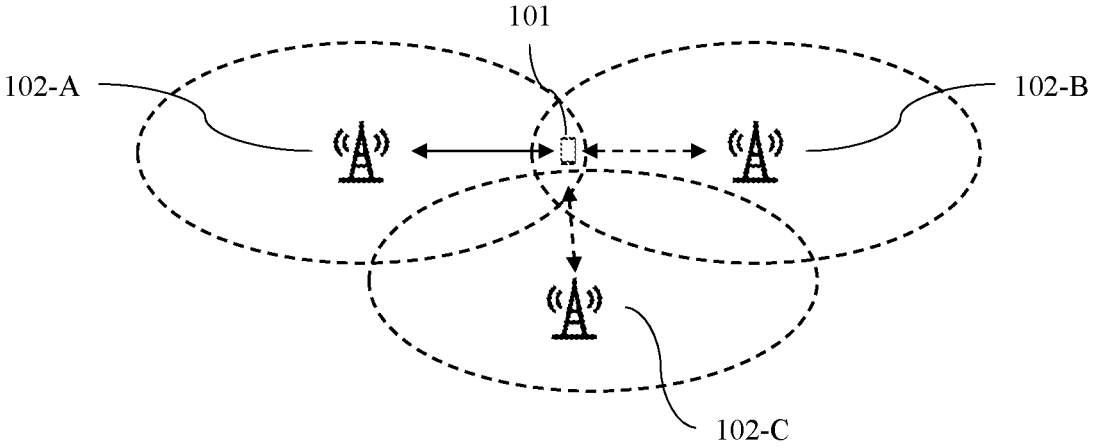
FIG. 1 illustrates a schematic diagram of a wireless communication system in accordance with some embodiments of the present disclosure.

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

While operations are depicted in the drawings in a particular order, persons skilled in the art will readily recognize that such operations need not be performed in the particular order shown or in sequential order, or that all illustrated operations be performed, to achieve desirable results, sometimes one or more operations can be skipped. Further, the drawings can schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing can be advantageous.

FIG. 1 depicts a wireless communication system according to an embodiment of the present disclosure.

As shown in FIG. 1, the wireless communication system includes UE 101, base station (BS) 102-A, base station 102-B, and base station 102-C. Even though a specific number of UE and BSs are depicted in FIG. 1, person skilled in the art will recognize that any number of UEs and BSs may be included in the wireless communication system.

The UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present disclosure, the UE 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 101 includes wearable devices, such as smart watches, fitness bands, optical head-mounted displays, or the like. Moreover, the UE 101 may be referred to as subscriber units, mobiles, mobile stations, users, terminals, mobile terminals, wireless terminals, fixed terminals, subscriber stations, UE 101, user terminals, a device, or by other terminology used in the art. The UE 101 may communicate directly with a BS via uplink (UL) communication signals.

The BSs may be distributed over a geographic region. In certain embodiments, a BS may also be referred to as an access point, an access terminal, a base, a base station, a macro cell, a Node-B, an enhanced Node B (eNB), a BS, a Home Node-B, a relay node, a device, or by any other terminology used in the art. The BSs are generally part of a radio access network that may include one or more controllers communicably coupled to one or more corresponding BSs.

The wireless communication system is compliant with any type of network that is capable of sending and receiving wireless communication signals. For example, the wireless communication system is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a 3rd Generation Partnership Project (3GPP)-based network, 3GPP 5G network, a satellite communications network, a high altitude platform network, and/or other communications networks.

In one implementation, the wireless communication system is compliant with the NR of the 3GPP protocol, wherein the BS transmits using an orthogonal frequency division multiplexing (OFDM) modulation scheme on the DL and the UE 101 transmits on the uplink using a single-carrier frequency division multiple access (SC-FDMA) scheme or OFDM scheme. More generally, however, the wireless communication system may implement some other open or proprietary communication protocol, for example, WiMAX, among other protocols.

In other embodiments, the BS may communicate using other communication protocols, such as the IEEE 802.11 family of wireless communication protocols. Further, in some embodiments the BS may communicate over licensed spectrum, while in other embodiments the BS may communicate over unlicensed spectrum. The present disclosure is not intended to be limited to the implementation of any particular wireless communication system architecture or protocol. In another embodiment, the BS may communicate with UE 101 using the 3GPP 5G protocols.

As shown in FIG. 1, the UE 101 is currently served by BS 102-A, and is within the junction area of the coverage served by BS 102-B and BS 102-C. The UE 101 may need to perform a conditional handover (CHO) procedure and BS 102-B and BS 102-C may be the candidate BSs during the CHO procedure for the UE 101. BS 102-A is considered as the source node, the source BS, the source gNB, the source eNB, or the like, and manages a source cell A. BS 102-B and BS 102-C may be considered as the candidate node, the candidate BS, the candidate gNB, the candidate eNB, etc., and BS 102-B manages a CHO candidate cell B, and BS 102-C a CHO candidate cell C respectively.

In some scenarios, the handover procedure to the target cell fails (e.g. RACH towards the target cell is not successful), the UE may take different actions according to different HO types.

In the circumstance of CHO only (that is, the UE is only configured with the CHO and is not configured with other types of handover), the UE can apply mechanism A as follows:

The UE performs cell selection,
if the selected cell is a CHO candidate cell, the UE performs handover; if handover to this CHO candidate cell fails, the UE performs RRC re-establishment;
if the selected cell is not a CHO candidate cell, the UE performs RRC re-establishment. (mechanism A ends)

In other word, if the selected cell is a CHO candidate cell, for example, the UE selects the CHO candidate cell B managed by BS 102-B based on the cell selection procedure, the UE performs the handover procedure to CHO candidate cell B; if the handover procedure to the CHO candidate cell B also fails, the UE performs the RRC re-establishment procedure. If the selected cell is not a CHO candidate cell, for example, the UE selects another cell managed by another BS which is not shown in FIG. 1, the UE performs the RRC re-establishment procedure.

In the case that UE 101 performs a DAPS HO only procedure between source BS 102-A and target BS 102-B (that is, the UE is only configured with the DAPS HO, and is not configured with other types of handover), for example, the UE performs the DAPS HO only procedure between the source cell A and the target cell B, if the handover procedure to the target cell B fails, the UE would fallback to the source cell A if the radio link failure (RLF) does not occur in the source cell A. If there is a RLF in the source cell A, the UE would perform the RRC re-establishment procedure to re-establish connection with the network.

In view of the above, the UE handling handover failure in DAPS HO only procedure or CHO only procedure are different. Therefore, when the UE is configured with both the DAPS HO and the CHO, there might be some issues in how to handle handover failure after the UE selects target cell from the CHO candidate cells for handover.

In the circumstance of DAPS HO only, after the UE fallback to the source cell, there is a possibility that even though RLF does not occur in the source cell when the handover failure happened, the quality of source cell may not be good or stable, and a RLF would occur shortly after the UE fallback to the source cell. Therefore, fallback to the source cell is not a good way for failure handling.

In the circumstance of CHO only, it is possible that even though a CHO candidate cell is selected after handover failure, the quality of the selected cell may not be good or stable since the selected cell may just satisfy the cell selection criterion (for example, S-criterion), and the UE would fail to handover to the selected cell.

Since high reliability and zero interruption time are required in coexistence of CHO and DAPS HO, the present disclosure proposes some solutions for handling the handover failure.

Figure 2:
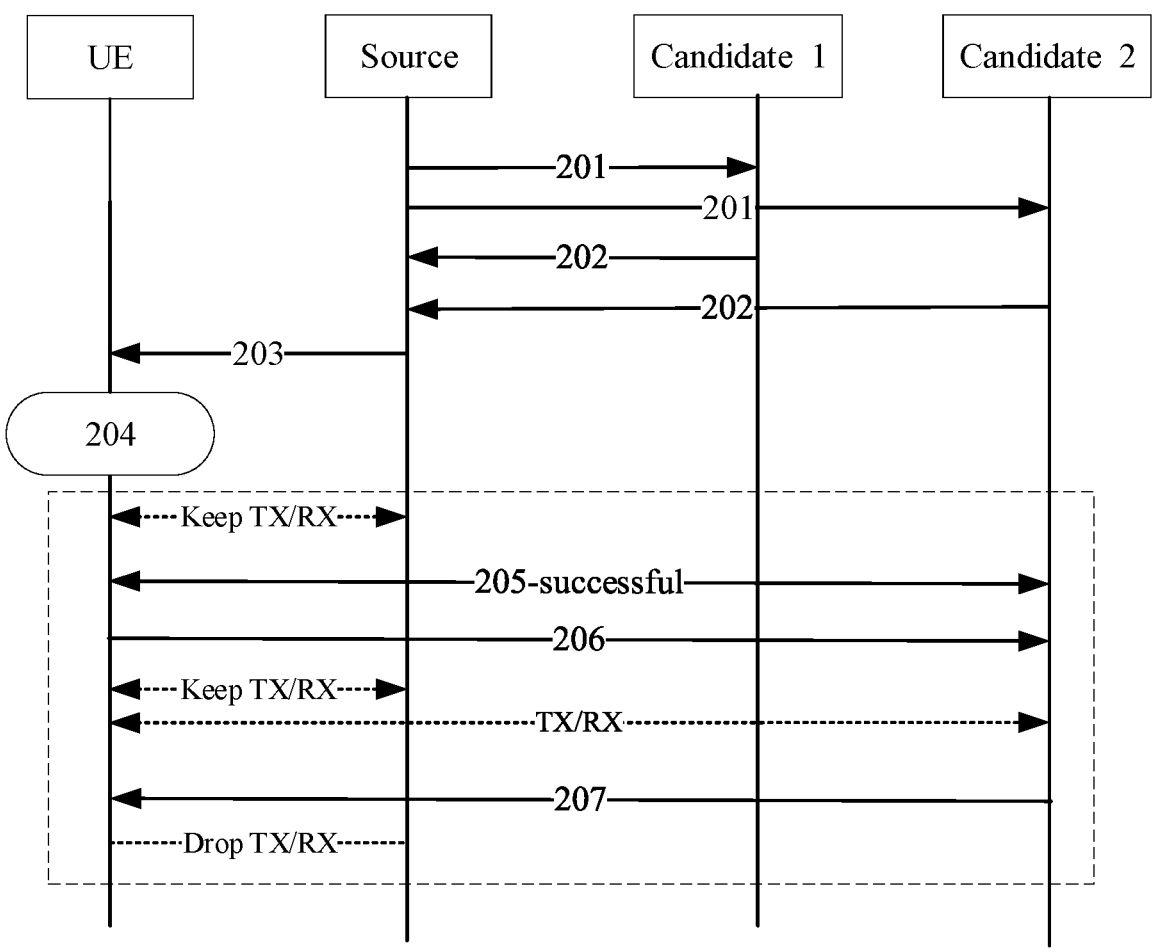
FIG. 2 illustrates an exemplary flow chart of a successful handover procedure with both CHO and DAPS HO configured according to some embodiments of the present disclosure.

FIG. 2 illustrates an exemplary flow chart of a successful handover procedure with both CHO and DAPS HO configured according to some embodiments of the present disclosure.

FIG. 2 includes five components, "UE", which refers to the user equipment, "source" refers to a source gNB, a source node, or a source master node, which manages a source cell, "Candidate 1" refers to one candidate gNB, or one candidate node, which manages CHO candidate cell 1, and "Candidate 2" refers to another candidate gNB, or another candidate node, which manages CHO candidate cell 2, "Selected" refers to a selected node which is not a candidate node or the source node, and it manages a cell 3. It should be noted that although two candidate gNBs are depicted in FIG. 2, the number of the candidate gNBs may be other numbers, such as: 1, 3, or other integral numbers. It also should be noted that although the above mentioned CHO candidate cell 1 (or CHO candidate cell 2) is managed by "Candidate 1" (or "Candidate 2"), besides CHO candidate cell 1 (or CHO candidate cell 2), other cells belonging to the "Candidate 1" (or "Candidate 2") can also be configured as the candidate cells.

In step 201, the source gNB transmits a handover request message to Candidate 1 and Candidate 2 separately. The handover request message includes per DRB DAPS indication and the CHO indication for candidate cell 1 and candidate cell 2 separately. That is, the handover procedure is a coexistence of CHO and DAPS at the same time. The source gNB also transmits a transparent RRC container with necessary information to prepare the handover at the target side.

After receiving the handover request message, the candidate gNBs perform admission control. Slice-aware admission control can be performed if the slice information is sent to the candidate gNBs. If the protocol data unit (PDU) sessions are associated with non-supported slices, the candidate gNB may reject such PDU sessions.

In step 202, each of the candidate gNBs sends the handover request acknowledge to the source gNB. Each of the handover request acknowledge includes the configuration of the CHO candidate cell and the per DRB DAPS HO indication. The CHO candidate cell is, for example, CHO candidate cell 1 whose configuration is generated by the "Candidate 1", or CHO candidate cell 2 whose configuration is generated by the "Candidate 2".

In step 203, the source gNB transmits the RRC reconfiguration message (which may be represented as RR ('Reconfiguration message) to the UE, containing CHO configurations and per DRB DAPS HO indication for each CHO candidate cell of one or more CHO candidate cells. The CHO configurations include the configuration of CHO candidate cell(s) generated by the candidate node(s) and execution condition(s) generated by the source node. Specifically, the RRC reconfiguration message includes the configuration of CHO candidate cell 1, CHO execution condition received from Candidate 1, and the per DRB DAPS HO indication which indicates that DAPS handover is accepted by Candidate 1. The RRC reconfiguration message also includes the configuration of CHO candidate cell 2, CHO execution condition received from Candidate 2, and the per DRB DAPS HO indication which indicates that DAPS handover is accepted by Candidate 2.

In step 204, the UE maintains connection with the source gNB after receiving RRC reconfiguration message, and starts evaluating the CHO execution conditions for the each candidate cell. That is, the UE keeps the transmission and reception with both the source node (the dashed line marked with "Keep TX/RX").

If CHO candidate cell 2, which is managed by Candidate 2 satisfies the corresponding CHO execution condition, candidate cell 2 is considered as the target cell, and in step 205, the UE applies the stored corresponding configuration for CHO candidate cell 2, synchronizes to the target cell (i.e. CHO candidate cell 2), e.g. performs a random access preamble transmission (RACH) procedure towards CHO candidate cell 2, and also keeps the transmission and reception with the source gNB.

In step 206, the UE completes the RRC handover procedure by sending message named as "RRCReconfiguration-Complete" to target gNB (i.e. "Candidate 2"). At this time, the UE still keeps the transmission and reception with both the source node (the dashed line marked with "Keep TX/RX") and Candidate 2 (the dashed line marked with "TX/RX").

In step 207, upon receiving an explicit release from the target gNB, the UE releases the source signaling radio bearer (SRB) resources, security configuration of the source cell and stops downlink or uplink reception or transmission with the source gNB. As shown in FIG. 2, the UE drops the transmission and reception with the source node (the dashed line marked with "Drop TX/RX").

Figure 3A:
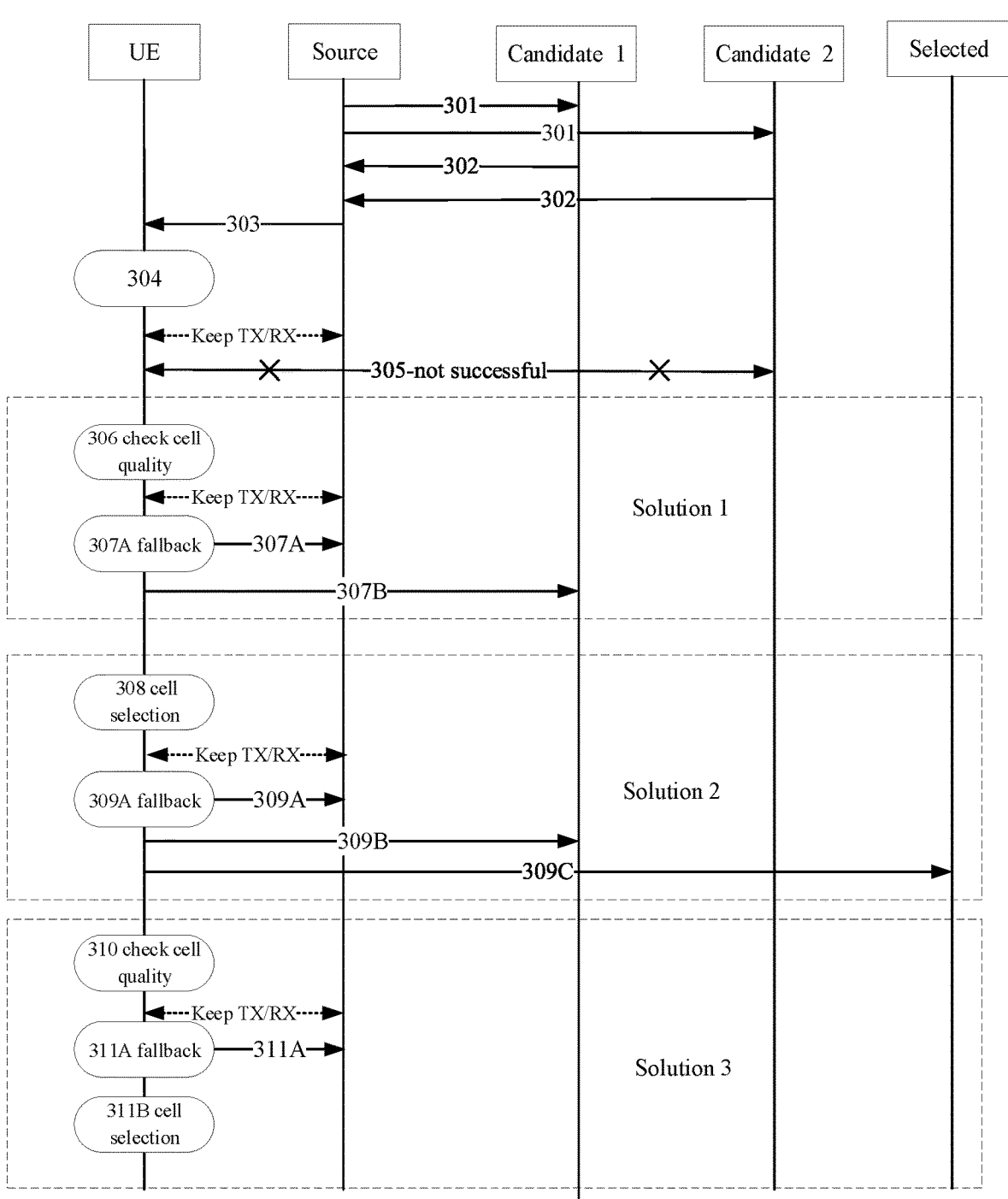
FIG. 3A illustrates an exemplary flow chart for handling failure with both CHO and DAPS HO configured according to some embodiments of the present disclosure.

FIG. 3A illustrates an exemplary flow chart for handling failure with both CHO and DAPS HO configured according to some embodiments of the present disclosure.

The components included in FIG. 3A are identical to FIG. 2, the steps 301-304 are similar to those steps 201-204, and the details are omitted here. At this time, the UE keeps the transmission and reception with both the source node (the dashed line marked with "Keep TX/RX").

In step 305, the UE performs the first handover procedure towards the first target cell, i.e. CHO candidate cell 2 whose CHO execution condition is met, and the first handover procedure fails.

FIG. 3A includes three solutions for handing the HO failure, which are included in the dashed box marked by "solution 1," "solution 2," and "solution 3," respectively. "Solution 1," "solution 2," and "solution 3" may be applied separately or jointly.

Solution 1

In step 306, the UE checks the cell quality of the source cell and all the CHO candidate cells. The cell quality is determined based on the reference signal receiving power (RSRP), reference signal receiving quality (RSRQ), or RSRP and signal to interference plus noise ratio (SINR), or any other parameters that represent the cell quality. Based on the cell qualities of each of the source cell and all the CHO candidate cells, the UE selects the cell with the best cell quality.

In the case that the source cell is selected and there is no RLF in the source cell, in step 307 A, the UE perform a fallback procedure to the source cell. Meanwhile, the UE can maintain the latest received CHO configurations, and indicate to the source node that the latest CHO configurations are maintained via failure information message in step 307 A. In this way, when the CHO configurations are modified, the source node can provide delta CHO configurations to the UE, i.e. delta CHO configurations is relative to the latest CHO configurations which maintained in the UE.

After the successful fallback procedure to the source cell, if a RLF occurs in the source cell, the UE may perform the abovementioned mechanism A or perform RRC re-establishment.

In the case that a CHO candidate cell, for example, candidate cell 1, has the best cell quality and is selected after cell selection, instead of performing step 307A, in step 307B, the UE performs the second handover procedure to candidate cell 1. If the second handover procedure still fails, the UE performs the RRC re-establishment procedure.

Alternatively, in the case that the source cell is not the best cell among the source cell and all the CHO candidate cells, the UE may apply the abovementioned mechanism A.

In solution 1, when the source cell has the best cell quality than any one of the CHO candidate cell, the UE can prioritize to fallback to the source cell, therefore, the recovery mechanism after handover failure is robust. Furthermore, in solution 1, the UE keeps the data communication with the source cell, until receiving the indication for source release from the target cell.

Solution 2

After the first handover procedure towards the first target cell fails in step 305, in step 308, the UE performs the cell selection procedure, meanwhile, the source configuration or the source link is maintained, in other words, the UE still keeps the transmission and reception with the source node.

In the case that the selected cell is the source cell, in step 309A, the UE perform a fallback procedure to the source cell. Compared with the abovementioned mechanism A, which includes the step: "if the selected cell is not a CHO candidate cell, the UE performs RRC re-establishment," the UE does not perform the RRC re-establishment procedure, but instead performs a fallback procedure to the source cell. Meanwhile, the UE can also maintain the latest received CHO configurations, and indicate to the source node that the latest CHO configurations are maintained via failure information message in step 309A. In this way, when the CHO configurations are modified, the source node can provide delta CHO configurations to the UE.

After the successful fallback procedure to the source cell, if a RLF occurs in the source cell, the UE may perform the abovementioned mechanism A or perform a RRC re-establishment procedure.

In the case that a CHO candidate cell, for example, candidate cell 1, is selected after cell selection, in step 309B, the UE performs the second handover procedure to candidate cell 1. If the second handover procedure still fails, the UE performs a fallback procedure to the source cell if RLF does not occur in the source cell. In the case that the fallback procedure to the source cell also fails, the UE performs the RRC re-establishment procedure.

In the case that the selected cell is neither the source cell nor a CHO candidate cell, in step 309C, the UE performs the RRC re-establishment procedure.

Compared with solution 1, the UE implementation is simpler in solution 2, since the UE does not need to measure and compare cell qualities of both the source cell and all the candidate cells when handover fails. However, solution 1 is more robust than solution 2. Furthermore, in solution 2, the UE keeps the data communication with the source cell, until receiving the indication for source release from the target cell.

Solution 3

After the first handover procedure towards the first target cell fails in step 305, in step 310, the UE first checks the cell quality of source cell by measuring the value of RSRP, RSRQ, or SINR, etc., and if the cell quality of source cell is higher than one threshold, in step 311A, the UE prioritizes to perform the fallback procedure to the source cell. The threshold may be specified in the spec, or included in the RRC message including CHO configurations and per DRB DAPS HO indication via step 303. Meanwhile, the UE can maintain the latest received CHO configurations, and indicate to the source node that the latest CHO configurations are maintained via failure information message in step 311A.

In the case that the cell quality of source cell is lower than or equal to the threshold, instead of performing step 311A, in step 311B, the UE performs a cell selection procedure.

In the case that a CHO candidate cell is selected, this CHO candidate cell can be considered as the second target cell, the UE performs the second handover procedure to the second target cell, and meanwhile the source configuration or the source link is maintained. If the second handover procedure still fails, the UE performs a fallback procedure to the source cell if RLF does not occur in the source cell. In the case that the fallback procedure to the source cell still fails, the UE performs the RRC re-establishment procedure.

In the case that the selected cell is neither the source cell nor a CHO candidate cell, the UE performs the RRC re-establishment procedure.

In Solution 3, the UE can prioritize to fallback to the source cell if source cell is good enough (e.g. higher than one threshold), the UE implementation is simpler than Solution 1, because the UE does not need to measure and compare cell qualities of both the source cell and all the candidate cells. Solution 3 is more robust than Solution 2. Furthermore, in solution 3, the UE keeps the data communication with the source cell, until receiving the indication for source release from the target cell.

Figure 3B:
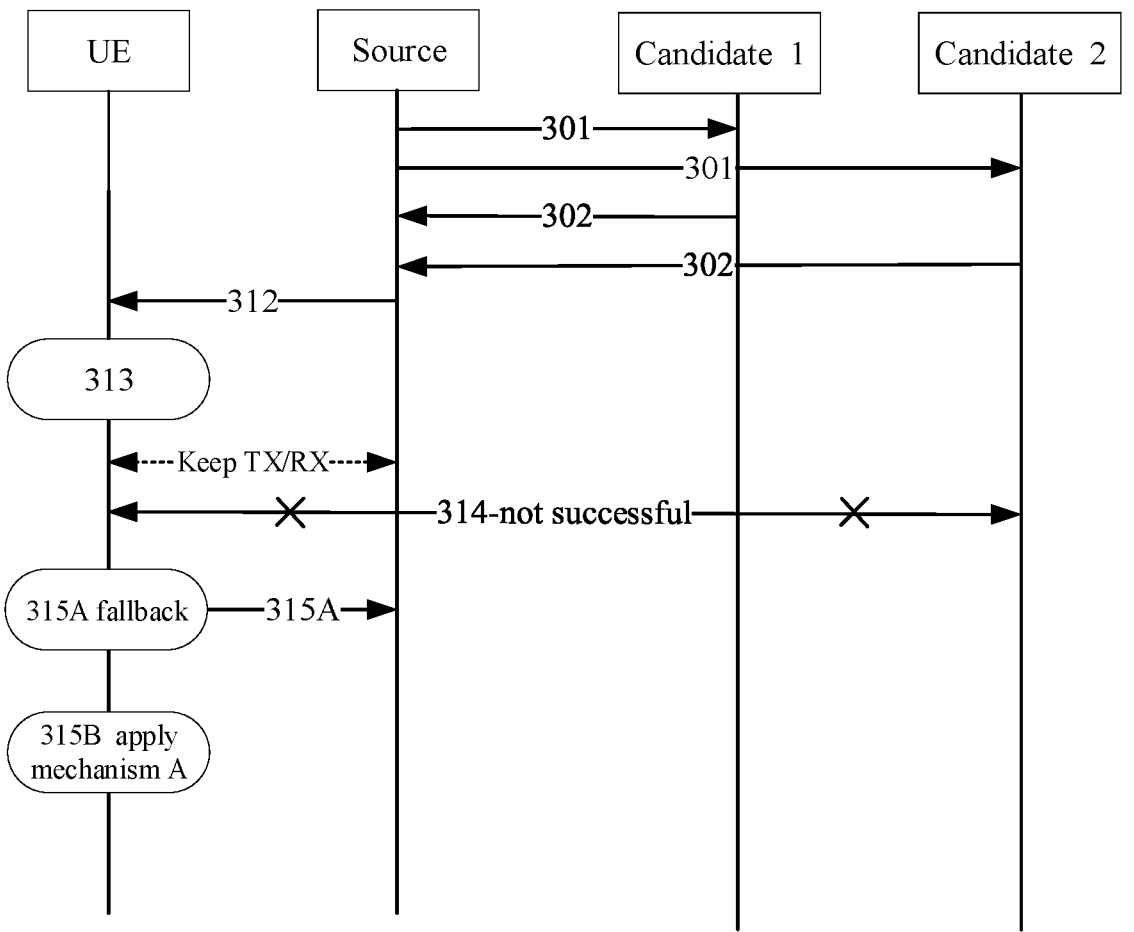
FIG. 3B illustrates another exemplary flow chart for handling failure with both CHO and DAPS HO configured according to some embodiments of the present disclosure.

FIG. 3B illustrates another exemplary flow chart for handling failure with both CHO and DAPS HO configured according to some embodiments of the present disclosure.

The components included in FIG. 3B are identical to FIG. 3A, the steps 301-302 are identical in both Figs, and the details are omitted here.

In step 312, the source gNB transmits the RRC reconfiguration message to the UE, in addition to the CHO configurations and per DRB DAPS HO indication for each CHO candidate cell of one or more CHO candidate cells, the RRC reconfiguration message may further include a new explicit indication, which is used to indicate the UE that whether fallback to the source cell is the prioritized way when the first handover fails after the UE selects the target cell from the candidate cells for handover.

In step 313, the UE maintains connection with the source gNB after receiving RRC reconfiguration message, and starts evaluating the CHO execution conditions for the each candidate cell. That is, the UE keeps the transmission and reception with both the source node (the dashed line marked with "Keep TX/RX").

In step 314, performs the first handover procedure towards the first target cell, i.e. CHO candidate cell 2 whose CHO execution condition is met, and the first handover procedure fails. Based on the explicit indication included in the RRC reconfiguration message, in step 315A, the UE perform a fallback procedure to the source node. Meanwhile, the UE can maintain the latest received CHO configurations, and indicate to the source node that the latest CHO configurations are maintained via failure information message in step 315A.

In some other embodiments, the explicit indication may be transmitted in another message after the RRC reconfiguration message transmitted in step 312, and before the UE starts evaluating the CHO execution conditions for the each candidate cell in step 313. In still other embodiments, the explicit indication may be transmitted after the UE evaluates the CHO execution conditions for the each candidate cell in step 313, and before the handover failure in step 314.

If the UE does not receive such an indication, instead of step 315A, in step 315B, the UE applies the abovementioned mechanism A as in CHO only procedure. In FIG. 3B, the UE keeps the data communication with the source cell, until receiving the indication for source release from the target cell.

In FIG. 3B, the network controls the UE's behaviour with an explicit indication, and the UE can follow network's instruction, which is easy for the UE to implement, and it is an easy way for handover failure recovery.

The above solutions in FIGS. 3A and 3B are performed based on different scenarios, some solutions may be performed at the same time, for example, the cell quality of source cell may satisfy both the condition in solution 1: "the source cell has the best cell quality than any one of the CHO candidate cell" and the condition in solution 3, "the cell quality of source cell is higher than one threshold," the UE may apply solution 1 or solution 3. Furthermore, the relation between the steps marked by the same number but with different suffix such as A, B, C is an alternative relation, that is, if step A is executed, step B will not be executed. For example, step 309A, step 309B, and step 309C are performed under different conditions; they are not performed at the same time.

The SCG failure may occur to the UE when both the CPAC and DAPS HO are configured.

The network can configure at least one candidate PSCell with CPAC execution condition, and meanwhile DAPS is configured for the candidate PSCell. After receiving the RRC message including CPAC configurations and per DRB DAPS HO indication for at least one candidate PSCell, the UE can select the cell whose CPAC execution condition is satisfied to be the target PSCell to handover to, and meanwhile the UE can keep transmission and reception with the source SCG (e.g. PSCell, or SCell(s)) until the MN or the target SN informs the UE to release source SCG. However, the handover to the target PScell may fail or a RLF in the target PSCell occurs shortly after a successful PSCell change from the source PSCell to the target PSCell, i.e. the SCG failure, and a RLF may happen in MN, i.e. MCG failure.

In R16, when SCG failure happens during CPAC procedure, the UE can report SCG failure to MN when MCG is not suspended (e.g. MCG failure does not occur), if MCG failure occurs upon the UE decides to send the SCG failure information, RRC re-establishment is performed.

In order to reduce the service interruption caused due to RRC re-establishment when MCG failure and SCG failure happen, the present disclosure proposes a solution for handling failure with both CPAC and DAPS HO configured.

Figure 4:
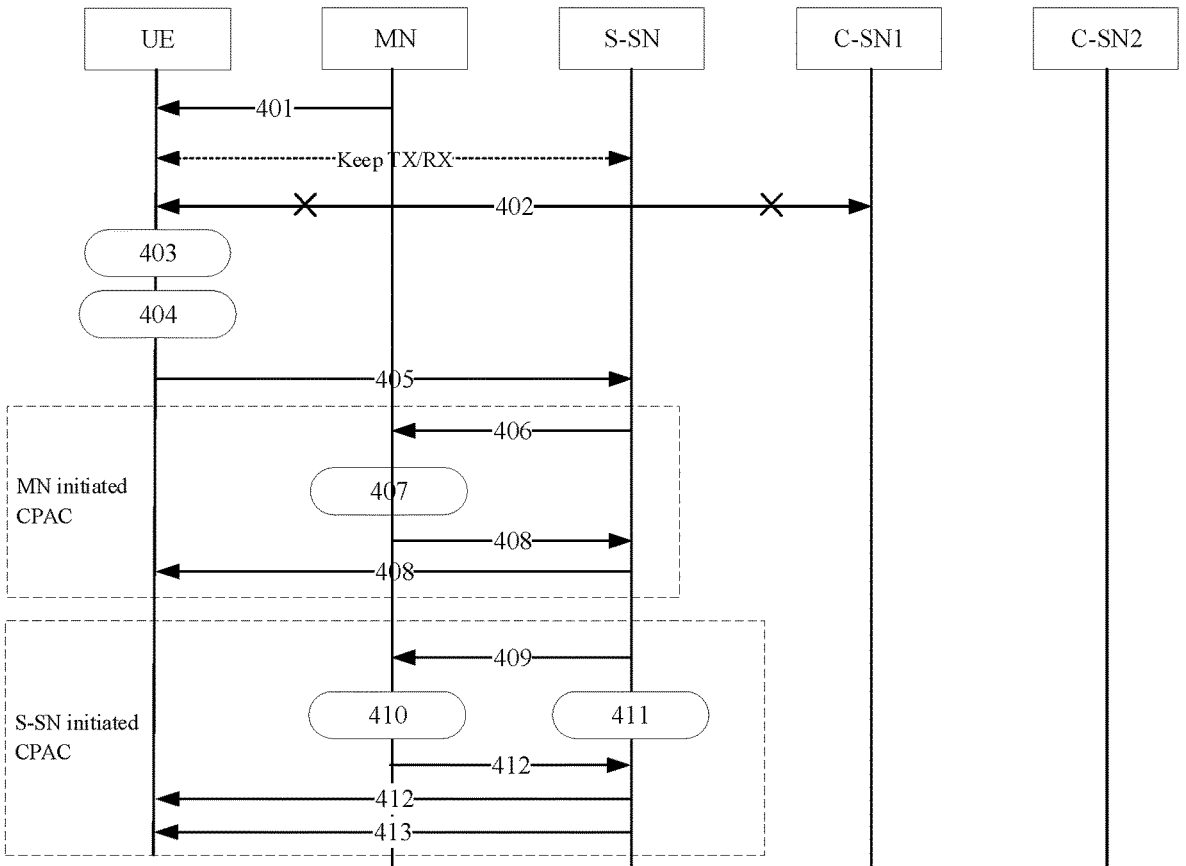
FIG. 4 illustrates another exemplary flow chart for handling failure with both CPAC and DAPS HO configured according to some embodiments of the present disclosure.

FIG. 4 illustrates another exemplary flow chart for handling failure with both CPAC and DAPS HO configured according to some embodiments of the present disclosure.

FIG. 4 includes five components, "UE", which refers to the user equipment, "MN," which refers to a master node, "S-SN", which refers to a source secondary node and manages a source PSCell, and "C-SN1" and "C-SN2", which refers to two candidate secondary nodes, and each manages a candidate PSCell, which may be referred to as candidate PSCell 1 and candidate PSCell 2. It should be noted that although two candidate secondary nodes are depicted in FIG. 4, the number of the candidate SNs may be other numbers, such as: 1, 3, or other integral numbers.

In step 401, the MN transmits the RRC configuration message, which includes both CPAC configurations and per DRB DAPS HO indication for each of candidate PSCell 1 and candidate PSCell 2. The RRC configuration message includes a RRC conditional reconfiguration element that consists of CPAC execution condition (if it is MN initiated CPAC, the CPAC execution condition is generated by the MN; if it is S-SN initiated CPAC, the CPAC execution condition is generated by the S-SN), and SN RRC reconfiguration message (generated by the candidate SN).

After receiving the RRC configuration message, the UE evaluates the CPAC execution condition(s) to select a target PSCell from the candidate PSCells, the target PSCell needs to meet its corresponding CPAC execution condition(s). Since it is a DAPS HO procedure, after selecting the target PSCell, the UE keeps the transmission and reception with the source SCG until the MN or the target SN informs the UE to release source SCG.

In step 402, after selecting the target PSCell, the UE performs the PSCell change procedure, e.g. performs a RACH procedure towards the target PSCell.

In step 403, it is determined that the RACH procedure towards the target PSCell fails, or an RLF in target PSCell occurs shortly after the successful PSCell change from the source PSCell to the target PSCell, i.e. the UE detects target-SCG (T-SCG) failure. The UE decides to send SCG failure information to the network.

In step 404, it is determined that RLF happened in MN, i.e. the UE detect MCG failure.

Since per DRB DAPS HO indication is configured, the UE keeps the transmission and reception with the S-SCG, in step 405, the UE can transmit the SCG failure information to the S-SN if SRB3 (signalling radio bearer) is configured, e.g. via ULInformationTransferMRDC message.

The SCG failure information can at least include the following information elements:

Measurement results in MCG when T-SCG failure happens.

Measurement results in SCG when T-SCG failure happens.

Cell Global Identity (CGI) of the Source PSCell: the source PSCell of the last PSCell change. The source PSCell could be Evolved Universal Terrestrial Radio Access (E-UTRA) cell or NR cell.

CGI of the Failed PSCell: the PSCell in which SCG failure is detected or the target PSCell of the failed PScell change. The Failed PSCell could be E-UTRA cell or NR cell.

timeSCGFailure: the time elapsed since the last PSCell change initialization until SCG failure.

failure type for SCG/connectionFailureType, e.g. radio link failure or SN/PSCell change failure.

random-access related information set by the PSCell.

Also, the UE sends MCG failure information to the S-SN. The MCG failure information may include: failure type for MCG, measurement results in MCG when MCG RLF occurs, measurement results in SCG when MCG RLF occurs, etc. The UE can transmit the MCG failure information to the S-SN if SRB3 (signalling radio bearer) is configured, e.g. via ULInformationTransferMRDC message.

Furthermore, to enable the S-SN to know whether SCG failure is caused due to MN initiated a CPAC, when the S-SN receives SCG failure and MCG failure information from the UE, a class 1 procedure would be performed. That is, the S-SN would send one message to MN to ask whether the MN triggered a CPAC, and MN would send a message to the S-SN to respond the asking message from the S-SN.

When the SCG failure is caused due to MN initiated CPAC, in step 406, the S-SN transmits both the MCG failure information and the SCG failure information to the MN.

In step 407, the MN can decide to trigger CPAC reconfiguration and/or MN reconfiguration, and in step 408, the MN sends the corresponding command for CPAC reconfiguration and/or MN reconfiguration to the UE via the S-SN.

Alternatively, if the SCG failure is caused due to S-SN initiated CPAC, in step 409, the S-SN transmits the MCG failure information to the MN.

In step 410, the MN triggers the MN reconfiguration, and in step 412, the MN sends the corresponding command for MN reconfiguration to the UE via the S-SN. On the other hand, in step 411, the S-SN can decide to trigger SN reconfiguration e.g. CPAC reconfiguration, and in step 413, the S-SN sends the corresponding command for SN reconfiguration to the UE. In some scenarios, the S-SN may transmit the MN reconfiguration received from MN in step 412 and the SN reconfiguration in a same message to the UE.

Figure 5:
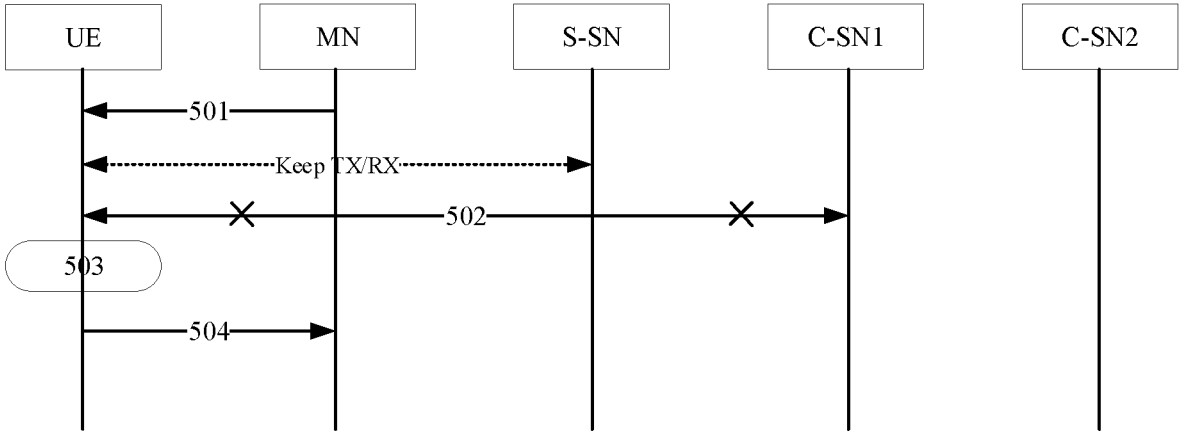
FIG. 5 illustrates another exemplary flow chart for handling failure with both CPAC and DAPS HO configured according to some embodiments of the present disclosure.

FIG. 5 illustrates another exemplary flow chart for handling failure with both CPAC and DAPS HO configured according to some embodiments of the present disclosure.

FIG. 5 includes the same five components as in FIG. 4, and steps 501-503 are similar to steps 401-403 respectively.

In step 503, the UE detects T-SCG Failure, and the UE decides to send SCG failure information to the network.

In FIG. 5, there is no RLF in the MN, that is, the MN is available, and the UE sends the SCG failure information to the MN, to let MN know that the UE still keeps active connection with the S-SN. An indication can be included in the SCG failure information (which may be represented as: SCGFailureInformation) message to indicate that S-SCG is still maintained by the UE.

Based on the measurement results and indication in the SCGFailureInformation message, the network can decide whether to trigger CPAC reconfiguration or cancel CPAC, for example, assume it is MN initiated CPAC, if the measurement results of S-SCG are good enough, the MN would perform CPAC cancel procedure with the candidate SN(s).

Figure 6:
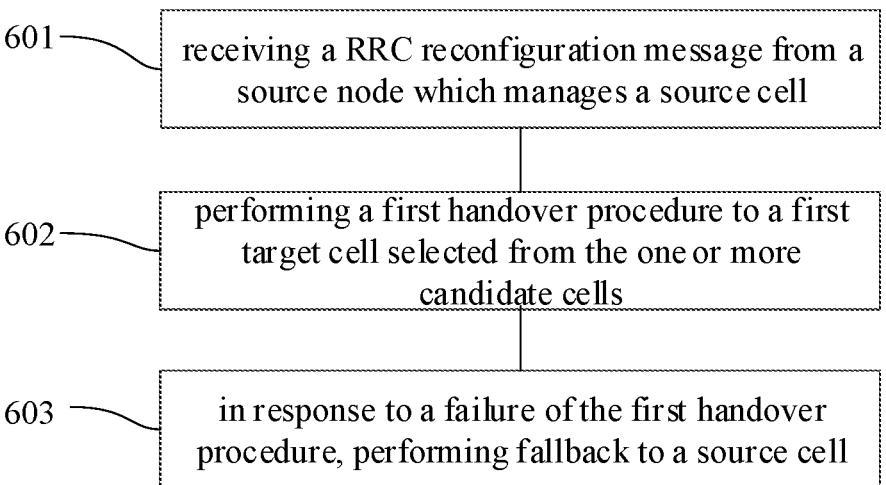
FIG. 6 illustrates a method performed by a UE for handling HO failure according to a preferred embodiment of the present disclosure.

FIG. 6 illustrates a method performed by a UE for handling HO failure according to a preferred embodiment of the present disclosure.

In operation 601, the UE receives a RRC reconfiguration message from a source node which manages a source cell, wherein the RRC reconfiguration message includes both CHO configurations and per DRB DAPS HO indication for each candidate cell of one or more candidate cells. In operation 602, the UE performing a first handover procedure to a first target cell selected from the one or more candidate cells.

In operation 603, the UE in response to a failure of the first handover procedure, performing fallback to a source cell when at least one of the following condition is met: a cell quality of the source cell is higher than or equal to that of each candidate cell of the one or more candidate cells, and there is no radio link failure (RLF) in the source cell; the source cell is selected by a cell selection procedure with configurations of the source cell maintained; the cell quality of the source cell is higher than a threshold; and an indication indicating the UE to perform fallback to the source cell is received. For example, as shown in FIG. 3A, in step 306, the UE checks the cell quality of the source cell and each candidate cell of the one or more candidate cells, and determines that the cell quality of the source cell is higher than or equal to that of each candidate cell of the one or more candidate cells, in step 307A, the UE performing fallback to the source cell.

In some embodiments, the UE maintains latest received CHO configurations; and transmits a message to the source node after the UE fallbacks to the source cell, wherein the message indicates that the latest received CHO configurations is maintained in the UE. For example, the message may be Failure Information message. In this way, the source node can provide delta CHO configurations if modification is triggered.

In some embodiments, in the case that the cell quality of the source cell is lower than that of a candidate cell of the one or more candidate cells, or there is a RLF in the source cell, the UE selects a candidate cell with a highest cell quality from the one or more candidate cells as a second target cell; and performs a second handover procedure to the second target cell. For example, in step 307B in FIG. 3A, the UE selects a candidate cell 1, which has the highest cell quality from candidate cell 1 and candidate cell 2 as a second target cell, and performs second handover procedure to the second target cell.

In some embodiments, in the case that a candidate cell from the one or more candidate cells is selected as a second target cell by a cell selection procedure with configurations of the source cell maintained, and in response to a failure of a second handover procedure to the second target cell, the UE performs fallback to the source cell if there is no RLF in the source cell. For example, in the step 309B in FIG. 3A, when the UE performs the second handover procedure to candidate cell 1. If the second handover procedure still fails, the UE performs a fallback procedure to the source cell if there is no RLF in the source cell.

In some embodiments, in the case that a selected cell by a cell selection procedure with configurations of the source cell maintained is not the source cell, or a cell from the one or more candidate cells, the UE performs a RRC re-establishment procedure. For example, in step 309C in FIG. 3A, the UE performs the RRC re-establishment procedure to the selected cell managed by the selected node.

In some embodiments, in the case that the cell quality of the source cell is not higher than the threshold, the UE performs a second handover procedure to a second target cell, wherein the second target cell is selected by a cell selection procedure, and the second target cell is a candidate cell of the one or more candidate cells; and maintains configurations of the source cell. For example, in step 309B in FIG. 3A, the UE performs a second handover procedure to a candidate cell 1.

In some embodiments, the UE in response to a failure of the second handover procedure to the second target cell, performing fallback to the source cell if there is no RLF in the source cell.

In some embodiments, in response to a failure of the second handover procedure to the second target cell, the UE performs a RRC re-establishment procedure if there is RLF in the source cell. For example, in step 307B in FIG. 3A, the UE performs the second handover procedure to candidate cell 1. If the second handover procedure still fails, the UE performs the RRC re-establishment procedure.

In some embodiments, the cell quality is determined based on reference signal receiving power (RSRP), reference signal receiving quality (RSRQ), or RSRP and signal to interference plus noise ratio (SINR).

Correspondingly, at the BS side, the BS transmits a RRC reconfiguration message to a UE, wherein the RRC reconfiguration message includes both CHO configurations and per DRB DAPS HO indication for each candidate cell of one or more candidate cells; and determines whether to transmits an indication indicating the UE to perform fallback to a source cell in the event of a handover failure. For example, in step 312 in FIG. 3B, the BS transmits an indication which indicates the UE to perform a fallback procedure to the source UE, and the indication is included in the RRC reconfiguration message.

FIG. 7 illustrates a method performed by a UE for handling SCG failure according to a preferred embodiment of the present disclosure.

In operation 701, the UE receives a RRC reconfiguration message from a MN, wherein the RRC reconfiguration message includes both CPAC configurations and per DRB DAPS HO indication of each candidate PSCell of one or more candidate PSCells; in operation 702, the UE detects a SCG failure including PSCell change failure or a RLF in a target PSCell which occurs shortly after a successful PSCell change from a source PSCell to the target PSCell; in operation 703, the UE detects a MCG failure; and in operation 704, the UE transmits SCG failure information and MCG failure information to a S-SN. For example, in FIG. 4, the UE receives a RRC reconfiguration message from a MN in step 401, detects a SCG failure in step 403, and detects a MCG failure in step 404, and in step 405 the UE transmits SCG failure information and MCG failure information to a S-SN.

Correspondingly, at the MN side, the MN transmits a RRC reconfiguration message to a UE, wherein the RRC reconfiguration message includes both CPAC configurations and per DRB DAPS HO indication of each candidate PSCell of one or more candidate PSCells; and receives SCG failure information and/or MCG failure information from a S-SN.

At the S-SN side, the S-SN receives SCG failure information and MCG failure information from a UE; and transmits MCG failure information and/or SCG failure information to the MN.

FIG. 8 illustrates a block diagram of an apparatus according to the embodiments of the present disclosure.

The apparatus may be or include at least a part of a BS (e.g., BS 102-A, BS-102-B), a UE (for example, UE 101), a MN, a S-SN, or other device with similar functionality.

The apparatus may include a transmitter, a processor, and a receiver, and the transmitter and the receiver are coupled with the processor. In some embodiments, the transmitter and the receiver can be combined into a transceiver. The processor is configured to perform any of the methods described in the present disclosure, for example, the method described with respect to FIG. 6 or 7. For example, when the apparatus is implemented as a UE, the receiver may receive a RRC reconfiguration message from a source node which manages a source cell, wherein the RRC reconfiguration message includes both CHO configurations and per DRB DAPS HO indication for each candidate cell of one or more candidate cells. The processor may perform a first handover procedure to a first target cell selected from the one or more candidate cells, and in response to a failure of the first handover procedure, the processor may further perform fallback to a source cell when at least one of the following condition is met: a cell quality of the source cell is higher than or equal to that of each candidate cell of the one or more candidate cells, and there is no radio link failure (RLF) in the source cell; the source cell is selected by a cell selection procedure with configurations of the source cell maintained; the cell quality of the source cell is higher than a threshold; and an indication indicating the UE to perform fallback to the source cell is received.

When the apparatus is implemented as a MN, the transmitter may transmit a RRC reconfiguration message to a UE, wherein the RRC reconfiguration message includes both CHO configurations and per DRB DAPS HO indication for each candidate cell of one or more candidate cells; and the processor may determine whether to transmit an indication indicating the UE to perform fallback to a source cell during a handover procedure of the UE.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each Fig. are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A user equipment (UE), comprising:

at least one memory; and at least one processor coupled with the at least one memory and configured to cause the UE to:

receive a radio resource control (RRC) reconfiguration message from a source node which manages a source cell, the RRC reconfiguration message including both conditional handover (CHO) configurations and per data radio bearer (DRB) dual active protocol stack (DAPS) HO indication for each candidate cell of one or more candidate cells;

perform a first handover procedure to a first target cell selected from the one or more candidate cells; and in response to a failure of the first handover procedure, perform fallback to the source cell when at least one of the following conditions is met:

a cell quality of the source cell is higher than or equal to that of each candidate cell of the one or more candidate cells, and there is no radio link failure (RLF) in the source cell;

the source cell is selected by a cell selection procedure with configurations of the source cell maintained;

the cell quality of the source cell is higher than a threshold; or an indication indicating that the UE is to perform fallback to the source cell is received.

2. The UE of claim 1, wherein the at least one processor is further configured to cause the UE to:

maintain latest received CHO configurations; and transmit a message to the source node after the UE fallbacks to the source cell, wherein the message indicates that the latest received CHO configurations are maintained in the UE.

3. The UE of claim 1, wherein, when the cell quality of the source cell is lower than that of a candidate cell of the one or more candidate cells, or when there is an RLF in the source cell, the at least one processor is further configured to cause the UE to:

select a candidate cell with a highest cell quality from the one or more candidate cells as a second target cell; and perform a second handover procedure to the second target cell.

4. The UE of claim 1, wherein, when a candidate cell from the one or more candidate cells is selected as a second target cell by a cell selection procedure with configurations of the source cell maintained, the at least one processor is further configured to cause the UE to:

in response to a failure of a second handover procedure to the second target cell, perform fallback to the source cell if there is no RLF in the source cell.

5. The UE of claim 1, wherein, when a selected cell by a cell selection procedure with configurations of the source cell maintained is not the source cell or a cell from the one or more candidate cells, the at least one processor is further configured to cause the UE to:

perform an RRC re-establishment procedure.

6. The UE of claim 1, wherein, when the cell quality of the source cell is not higher than the threshold, the at least one processor is further configured to cause the UE to:

perform a second handover procedure to a second target cell, wherein the second target cell is selected by a cell selection procedure, and the second target cell is a candidate cell of the one or more candidate cells; and maintain configurations of the source cell.

7. The UE of claim 3, wherein the at least one processor is further configured to cause the UE to:

in response to a failure of the second handover procedure to the second target cell, perform fallback to the source cell if there is no RLF in the source cell.

8. The UE of claim 3, wherein the at least one processor is further configured to cause the UE to:

in response to a failure of the second handover procedure to the second target cell, perform a RRC re-establishment procedure if there is a RLF in the source cell.

9. A user equipment (UE), comprising:

at least one memory; and at least one processor coupled with the at least one memory and configured to cause the UE to:

receive a radio resource control (RRC) reconfiguration message from a master node (MN), the RRC reconfiguration message including both conditional primary secondary cell (PSCell) addition and change (CPAC) configurations and per data radio bearer (DRB) dual active protocol stack (DAPS) HO indication for one or more candidate PSCells;

transmit SCG failure information and MCG failure information to a source secondary node (S-SN);

detect a secondary cell group (SCG) failure including PSCell change failure or a radio link failure (RLF) in a target PSCell which occurs shortly after a successful PSCell change from a source PSCell to the target PSCell; and detect a master cell group (MCG) failure.

10. A method performed by user equipment (UE), the method comprising:

receiving a radio resource control (RRC) reconfiguration message from a source node which manages a source cell, the RRC reconfiguration message including both conditional handover (CHO) configurations and per data radio bearer (DRB) dual active protocol stack (DAPS) HO indication for each candidate cell of one or more candidate cells;

performing a first handover procedure to a first target cell selected from the one or more candidate cells; and in response to a failure of the first handover procedure, performing fallback to a source cell when at least one of the following condition is met:

a cell quality of the source cell is higher than or equal to that of each candidate cell of the one or more candidate cells, and there is no radio link failure (RLF) in the source cell;

the source cell is selected by a cell selection procedure with configurations of the source cell maintained;

the cell quality of the source cell is higher than a threshold; or an indication indicating that the UE is to perform fallback to the source cell is received.

11. The method of claim 10, further comprising:

maintaining latest received CHO configurations; and transmitting a message to the source node after the UE fallbacks to the source cell, wherein the message indicates that the latest received CHO configurations is maintained in the UE.

12. The method of claim 10, wherein, when the cell quality of the source cell is lower than that of a candidate cell of the one or more candidate cells, or there is a RLF in the source cell, the method further comprises:

selecting a candidate cell with a highest cell quality from the one or more candidate cells as a second target cell; and performing a second handover procedure to the second target cell.

13. The method of claim 10, wherein, when a candidate cell from the one or more candidate cells is selected as a second target cell by a cell selection procedure with configurations of the source cell maintained, the method further comprises:

in response to a failure of a second handover procedure to the second target cell, performing fallback to the source cell if there is no RLF in the source cell.

14. The method of claim 10, wherein, when a selected cell by a cell selection procedure with configurations of the source cell maintained is not the source cell, or a cell from the one or more candidate cells, the method further comprises:

performing a RRC re-establishment procedure.

15. The method of claim 10, wherein, when the cell quality of the source cell is not higher than the threshold, the method further comprises:

performing a second handover procedure to a second target cell, wherein the second target cell is selected by a cell selection procedure, and the second target cell is a candidate cell of the one or more candidate cells; and maintaining configurations of the source cell.

16. A processor for wireless communication, comprising:

at least one controller coupled with at least one memory and configured to cause the processor to:

receive a radio resource control (RRC) reconfiguration message from a source node which manages a source cell, the RRC reconfiguration message including both conditional handover (CHO) configurations and per data radio bearer (DRB) dual active protocol stack (DAPS) HO indication for each candidate cell of one or more candidate cells;

perform a first handover procedure to a first target cell selected from the one or more candidate cells; and in response to a failure of the first handover procedure, perform fallback to a source cell when at least one of the following condition is met:

a cell quality of the source cell is higher than or equal to that of each candidate cell of the one or more candidate cells, and there is no radio link failure (RLF) in the source cell;

the source cell is selected by a cell selection procedure with configurations of the source cell maintained;

the cell quality of the source cell is higher than a threshold; or an indication indicating that the processor is to perform fallback to the source cell is received.

17. The processor of claim 16, wherein the at least one controller is further configured to cause the processor to:

maintain latest received CHO configurations; and transmit a message to the source node after the processor fallbacks to the source cell, wherein the message indicates that the latest received CHO configurations are maintained in the processor.

18. The processor of claim 16, wherein, when the cell quality of the source cell is lower than that of a candidate cell of the one or more candidate cells, or there is a RLF in the source cell, the at least one controller is further configured to cause the processor to:

select a candidate cell with a highest cell quality from the one or more candidate cells as a second target cell; and perform a second handover procedure to the second target cell.

19. The processor of claim 16, wherein, when a candidate cell from the one or more candidate cells is selected as a second target cell by a cell selection procedure with configurations of the source cell maintained, the at least one controller is further configured to cause the processor to:

in response to a failure of a second handover procedure to the second target cell, performing fallback to the source cell if there is no RLF in the source cell.

20. The processor of claim 16, wherein, when a selected cell by a cell selection procedure with configurations of the source cell maintained is not the source cell, or a cell from the one or more candidate cells, the at least one controller is further configured to cause the processor to:

performing a RRC re-establishment procedure.

\* \* \* \* \*